United States Patent Office 3,562,093
Patented Feb. 9, 1971

3,562,093
BICOMPONENT FILAMENTS
James Dennis Griffiths, Coventry, and Colin David May, Kenilworth, England, assignors to Courtaulds Limited, London, England, a British company
No Drawing. Filed Feb. 28, 1967, Ser. No. 619,149
Claims priority, application Great Britain, Feb. 28, 1966, 8,594/66
Int. Cl. D01d 5/28
U.S. Cl. 161—173                5 Claims

ABSTRACT OF THE DISCLOSURE

A bicomponent filament consisting of a crystalline polymer component and a block copolymer component consisting of segments of a condensation homopolymer and a random condensation copolymer.

---

This invention relates to crimpable bicomponent filaments, that is oriented filaments consisting of two adherent components of which one is capable of shrinking more than the other when the filaments are annealed whereby the filaments are drawn into a helical crimp. The components may be arranged collaterally, or one component may be the core and the other the sheath of an individual filament.

It has been proposed to pair many polymers in the manufacture of bicomponent filaments and in almost all cases it has been possible to demonstrate that the filaments have crimped when annealed in a substantially tensionless condition. However, the ability of the filaments to recover the crimp between intermittently applied tensions—an important property of durably crimped filaments—is seldom referred to. It is this property which allows a textile embodying the filaments to retain its appearance in use and, in many cases, the previously proposed bicomponent filaments are deficient in this respect.

We have found a class of bicomponent filament which may be durably crimped.

According to the present invention a bicomponent filament has, as one component, a crystalline polymer and another, more shrinkable component consisting of a block copolymer containing segments of a condensation homopolymer chosen from the group consisting of homopolyamide and homopolyester, and segments of a random copolymer chosen from the group consisting of copolyamide and copolyester. The crystalline polymer preferably contributes between 30 and 55 percent by weight of the filament.

The crystalline polymer is preferably a homopolymer, such as a homopolyamide, for example nylon 6, nylon 66, nylon 8, nylon 11 and nylon 12, polyethylene terephthalate, polypivalolacetone or stereo-regular polypropylene. However, certain copolymers, for example those which contain ethylene terephthalate units and a minor proportion of ethylene isophthalate units and which, nevertheless, retain the ability to crystallise, may also be used.

The homopolyamide segments of the block copolymer may be, for example, polycaproamide, polyhexamethylene sebacamide and polyhexamethylene adipamide. The alternative homopolyester segments are preferably polyethylene terephthalate but may also be polypivalolactone.

The random copolyamide segments of the block copolymer may contain two or more nylon monomer units of the kind caproamide, undecanoamide, hexamethylene adipamide and hexamethylene sebacamide. The alternative random polyester segments may contain two or more units of the kind ε-caproate, ethylene adipate, ethylene terephthalate and ethylene sebacate, or the mixed ester of one dibasic acid with two or more glycols e.g. ethylene/2:2 dimethyl proplyene terephthalate.

The block copolymer would therefore have the general structure

AAAAAAABCCBBCBCBBAAAAAAAA where A represents the repeating unit of the homopolymer segment and B and C represent the individual comonomer units of the random copolymer segment. It will be understood that monomer A may be the same as monomer B or C.

Of the two kinds of segments making up the more shrinkable component the random copolymer segments are chiefly responsible for the shrinkage characteristics and the homopolymeric segments keep the melting point of the component high and increase the resistance of the component to plasticisation by hot water. The relative proportion of the segments in the more shrinkable component may, therefore, be varied over a wide range whilst retaining useful properties but we prefer that the more shrinkable component should contain between 20 and 70 percent by weight of the homopolymer, preferably between 20 and 40 percent.

It is necessary that the components of the filament adhere well and we prefer, therefore, that the crystalline polymer component should be chemically similar to the homopolyamide or homopolyester segments of the block copolymer component.

A process for making the block copolymer component comprises melting together a homopolyamide or homopolyester and the less crystalline polymer so that by a process either of transamidation or transesterification the two combine forming the block copolymer.

The various techniques of spinning bicomponent filaments are well known. After extrusion the filaments are stretched so that the more shrinkable component is in a strained condition, from which it contracts when annealed. The annealing process involves heating the filaments; preferably, for the bicomponent filament largely composed of polyamide components, the heating medium is wet, for example the filaments may be immersed in hot water or steam.

The invention includes annealed bicomponent filaments.

The invention is illustrated by the following examples in which parts and percentages are by weight.

EXAMPLE I

A random binary copolymer (130 parts) of ε-caproamide and hexamethylene adipamide containing 60 percent of ε-caproamide units, having an intrinsic viscosity of 1.16 dl./g. at 0.5 percent concentration in formic acid, was stirred under nitrogen for 1½ hours at 265° C. with 70 parts of polyhexamethylene adipamide having an intrinsic viscosity similarly measured, of 2.58 dl./g. At the end of this time the mixture of polymers had, by a process of transamidation, become a block copolyamide having a melting point of from 196° to 198° C., and an intrinsic viscosity of 1.18 dl./g. at 0.5 percent concentration in formic acid.

The block copolymer and an additional quantity of the polyhexamethylene adipamide were extruded at a temperature of 245° C. side by side through a jet having six holes each of 0.025 inch diameter to produce a collateral bicomponent filament, equal volumes of the two components being present in the filaments. The filaments were wound up at a rate of 100 metres per minute and then cold-drawn by 200 percent of their original length at 5 metres per minute to give a final denier per filament of 3.5. Skeins of the filaments under (a) zero tension and (b) a load of 0.00065 g.p.d. (an approximation of the restraining force on the filaments in knitted fabrics) were placed in water at 95° C. for one minute. During this treatment all the skeins contracted and the filaments crimped. After they had been dried at room temperature the skeins were examined from crimp elongation. Percent crimp elongation is defined in the following formula:

$$\text{Percent crimp elongation} = \frac{L - L_c}{L_c} \times 100$$

where L=length of skein under tension sufficient to remove crimp in filaments and $L_c$=length of tensionless skein. The results obtained are set out in the following table:

TABLE 1

| Crimping load: | Percent crimp elongation |
|---|---|
| 0.0 | 220 |
| 0.00065 g.p.d. | 111 |

The crimp developed in the filaments under zero tension had an average value of about 80 turns per inch with a radius of curvature of 0.006 inch. Crimp retention measurements were carried out on the skeins where the crimp had been developed under zero tension. These results are contained in Table 2.

TABLE 2

| Loading: | Percent crimp retention [1] |
|---|---|
| 1.0 g.p.d. for 1 minute | 100 |
| 1 g.p.d. for 30 minutes | 83 |
| 0.1 g.p.d. for 24 hours | 49 |

[1] Crimp retention is expressed as a percentage of the original crimp elongation.

EXAMPLE II

A random binary copolymer (68 parts) consisting of units of ε-caproamide and hexamethylene adipamide and containing 60 percent of ε-caproamide, was made with an intrinsic viscosity of 1.16 dl./g. at 0.5 percent concentration of formic acid. The copolymer was stirred under nitrogen for 1½ hours at 265° C. with 32 parts of polyhexamethylene adipamide having an intrinsic viscosity, similarly measured, of 2.49 dl./g.

In the course of being mixed together the copolymer and polymer had condensed, forming a block copolyamide having a melting point in the range of 218 to 219° C. and an intrinsic viscosity of 1.20 dl./g. at 0.5 percent concentration of formic acid.

The block copolymer and an additional quantity of the polyhexamethylene adipamide homopolymer were extruded at a relative rate by weight of 3:2 respectively and at a temperature of 245° C., side by side through a jet having six holes, each of 0.025 inch diameter, to produce a collateral bicomponent filament. Filaments were wound up at a ratio of 100 metres per minute and then cold-drawn at a draw ratio of 4:1 at 5 metres per minute to give a final denier per filament of 3.5. Skeins of the filaments under zero tension were placed in water at 90° C. for 1 minute during which time all the individual filaments contracted and crimped.

After drying, at room temperature, the skeins were examined for crimp elongation in the way described in Example I. It was found that the average crimp elongation was 275 percent and the filaments had an average crimp of 80 turns per inch with a radius of curvature of 0.006 inch. The crimp retention measurements gave the following results:

TABLE 3

| Loading: | Percent crimp retention |
|---|---|
| 1 g.p.d. for 1 minutte | 100 |
| 1 g.p.d. for 30 minutes | 73 |
| 0.1 g.p.d. for 24 hours | 67 |

For comparison, a commercial, crimped bicomponent filament having polyhexamethylene adipamide as one component and a random copolymer consisting of units of hexamethylene adipamide and hexamethylene sebacamide, as the other component, was subjected to the crimp retention tests, with the following results:

| Loading: | Percent crimp retention |
|---|---|
| 1 g.p.d. for 1 minute | 73 |
| 1 g.p.d. for 30 minutes | 72 |
| 0.1 g.p.d. for 24 hours | 53 |

EXAMPLE III 68 parts of a random copolymer containing by weight 70 percent of ε-caproamide and 30 percent of hexamethylene adipamide units and having an intrinsic viscosity of 1.18 dl./g. at 0.5 percent concentration in formic acid was melted under nitrogen with 32 parts by weight of polyhexamethylene adipamide having an intrinsic viscosity, similarly measured, of 2.36 dl./g. The molten mixture was stirred throughout the period of heating and had formed, at the end of this period, a block polyamide having a melting point of from 221 to 222° C., and an intrinsic viscosity of 1.20 dl./g. at 0.5 percent concentration in formic acid.

The block copolymer was melt spun collaterally with an additional quantity of the polyhexamethylene adipamide through each hole of a jet having six holes, each of 0.25 inch diameter, to produce a bicomponent filament. The weight ratio of the two components in the filaments was 68 parts of the block copolymer to 32 parts of the homopolymer. The filaments were wound and drawn as described in Example I to give skeins which were annealed in water at 95° C. for 1 minutes. The crimped filaments made in this way were dried and the crimp analysed as described in the preceding examples. Crimp elongation was 400 percent and the crimp retention figures are itemised in Table 4.

TABLE 4

| Loading: | Percent crimp retention |
|---|---|
| 1 g.p.d. for 1 minute | 100 |
| 1 g.p.d. for 30 minutes | 76 |
| 0.1 g.p.d. for 24 hours | 52 |

EXAMPLE IV

A block copolymer was prepared by melting together polyethylene terephthalate having a melting point of 262° C. and an intrinsic viscosity of 0.5 dl./g. at 1 percent concentration in 60:40 (w./w.) phenol-tetrachloroethylene at 30° C. and a random copolymer prepared by condensing 1 mol of terephthalic acid with 1 mol of mixed glycols made up of 0.7 mol of ethylene glycol and 0.3 mol of 2,2-dimethyl propane-1,3-diol. The mixture was stirred at 270° C. under a pressure of 0.5 mm. Hg for 30 minutes and then for a further period of 30 minutes at 270° C. under a pressure of 300 mm. Hg. At the end of this time the mixture had formed a block copolyester having a melting point of 235° C. and an intrinsic viscosity of 0.7 dl./g., determined as above. The block copolymer was extruded at 250° C. side by side with a crystalline random copolymer containing 90 percent polyethylene terephthalate and 10 percent polyethylene isophthalate through each hole of a six holed jet, the diameter of each hole being 0.025 inch.

The resulting filaments had a collateral bicomponent structure with equal volumes of the two components present in each filament. The filaments were wound up at 70 metres per minute and then drawn over a hot plate at 80° C. to a draw ratio of 550 percent to give a final denier of 4.5. A skein of yarn was heated in an oven at 90° C. for 10 minutes under negligible tension during which time the skein contracted and the filaments crimped. The crimp developed had an average value of 80 turns per inch with a radius of curvature of 0.006 inch. The crimp retention figures were as follows:

TABLE 5

| Loading: | Percent crimp retention |
|---|---|
| 1 g.p.d. for 1 minute | 100 |
| 1 g.p.d. for 30 minutes | 76 |
| 0.1 g.p.d. for 24 hours | 67 |

What we claim is:

1. A collateral bicomponent filament having as one component a crystalline polymer and, as the other component, a block copolymer consisting of segments of a condensation homopolymer chosen from the group consisting of homopolyester and homopolyamide, and segments of a random copolymer chosen from the group consisting of copolyamide and copolyester.

2. A collateral bicomponent filament as claimed in claim 1 in which the random copolymer segments of the block copolymer consist essentially of units of caproamide and hexamethylene adipamide.

3. A collateral bicomponent filament as claimed in claim 1 in which the block copolymer contains between 20 and 70 percent by weight of the condensation homopolymer.

4. A collateral bicomponent filament as claimed in claim 1 comprising a polycaproamide component and a block copolymer component consisting essentially of 20 to 70 percent by weight of segments of polycaproamide and from 80 to 30 percent by weight of segments of a random copolymer consisting of units of caproamide and hexamethylene adipamide.

5. A collateral bicomponent filament as claimed in claim 1 in which the crystalline polymer component contributes between 30 and 55 percent by weight of the filament.

References Cited

UNITED STATES PATENTS

| 2,190,770 | 2/1940 | Carothers | 260—78 |
| 2,931,091 | 4/1960 | Breen | 264—171 |
| 3,369,057 | 2/1968 | Twilley | 260—857 |
| 3,459,846 | 8/1969 | Matsui et al. | 264—171 |

ROBERT F. BURNETT, Primary Examiner

R. O. LINKER, Jr., Assistant Examiner

U.S. Cl. X.R.

161—175, 177; 260—857